United States Patent [19]
Nakada

[11] Patent Number: 6,104,983
[45] Date of Patent: Aug. 15, 2000

[54] METHOD AND APPARATUS FOR MEASURING WAVEFORM QUALITY OF CDMA SIGNAL

[75] Inventor: Juichi Nakada, Kumagaya, Japan

[73] Assignee: Advantest Corporation, Tokyo, Japan

[21] Appl. No.: 08/986,644

[22] Filed: Dec. 8, 1997

[30] Foreign Application Priority Data

Dec. 9, 1996 [JP] Japan .................................. 8-328402

[51] Int. Cl.[7] ...................................................... H04B 3/46
[52] U.S. Cl. ........................... 702/66; 375/224; 375/226; 370/320; 370/335; 370/342; 370/441; 455/67.1; 702/69; 702/106
[58] Field of Search ............................... 702/66, 69, 106; 375/224, 226, 324; 370/320, 335, 342, 441; 455/67.1

[56] References Cited

U.S. PATENT DOCUMENTS 5,799,038  8/1998  Nowara et al. ........................ 375/224

OTHER PUBLICATIONS

Birgenheier R. A.: "Overview of Code–Domain Power, Timing, and Phase Measurements", Hewlett–Packard Journal, vol. 47, No. 1, Feb. 1, 1996, pp. 73–93.

Primary Examiner—Marc S. Hoff
Assistant Examiner—Hien Vo
Attorney, Agent, or Firm—Staas & Halsey LLP

[57] ABSTRACT

The present invention offers a method and apparatus for measuring the waveform quality of a CDMA signal with increased accuracy. A baseband digital measuring signal $Z(k)$ from a quadrature transform/complementary filter 22 is applied to a demodulating part 25, wherein it is demodulated by a PN code of a pilot signal to detect a bit train and an amplitude $a'_i$. An ideal signal $R_i$ is generated from the bit train, the amplitude $a'_i$ and the PN code. At the same time, auxiliary data A, B, C, H and I, which are used to solve approximate simultaneous equations for computing parameters that minimize the square of the difference between the ideal signal $R_i$ and the measuring signal $Z(k)$, are generated in an ideal signal/auxiliary data generating part 26. The thus obtained auxiliary data and the measuring signal $Z(k)$ are used to solve the simultaneous equations to estimate the parameters in a parameter estimating part 27. The parameters are optimized by repeatedly correcting the measuring signal $Z(k)$, the ideal signal $R_i$ and the auxiliary data A, B, C, H, I based on-the estimated parameters and estimating the parameters based on the corrected data. When the parameters are optimized, the power coefficient $\rho_i$ is computed using the optimized measuring signal $Z(k)$ and the PN code.

5 Claims, 4 Drawing Sheets

FIG. 1A $$\begin{array}{c}\dfrac{\partial\varepsilon^2}{\partial\Delta\omega}\\[4pt]\dfrac{\partial\varepsilon^2}{\partial\Delta a_n}\\[4pt]\dfrac{\partial\varepsilon^2}{\partial\Delta\tau_n}\\[4pt]\dfrac{\partial\varepsilon^2}{\partial\Delta\theta_n}\end{array}\left\{\begin{array}{ccccccccc} & \Delta\omega & & \Delta a_i & & & \Delta\tau_i & \\ P(\Delta\omega\Delta\omega) & P(\Delta\omega\Delta a_0) & \cdots & P(\Delta\omega\Delta a_i) & \cdots & P(\Delta\omega\Delta a_{63}) & P(\Delta\omega\Delta\tau_0) & \cdots P(\Delta\omega\Delta\tau_i) & \cdots P(\Delta\omega\Delta\tau_{63}) \\ P(\Delta a_0\Delta\omega) & P(\Delta a_0\Delta a_0) & \cdots & P(\Delta a_0\Delta a_i) & \cdots & P(\Delta a_0\Delta a_{63}) & P(\Delta a_0\Delta\omega\tau_0) & \cdots P(\Delta a_0\Delta\tau_i) & \cdots P(\Delta a_0\Delta\tau_{63}) \\ P(\Delta a_i\Delta\omega) & P(\Delta a_i\Delta a_0) & \cdots & P(\Delta a_i\Delta a_i) & \cdots & P(\Delta a_i\Delta a_{63}) & P(\Delta a_i\Delta\tau_0) & \cdots P(\Delta a_i\Delta\tau_i) & \cdots P(\Delta a_i\Delta\tau_{63}) \\ P(\Delta a_{63}\Delta\omega) & P(\Delta a_{63}\Delta a_0) & \cdots & P(\Delta a_{63}\Delta a_i) & \cdots & P(\Delta a_{63}\Delta a_{63}) & P(\Delta a_{63}\Delta\tau_0) & \cdots P(\Delta a_{63}\Delta\tau_i) & \cdots P(\Delta a_{63}\Delta\tau_{63}) \\ P(\Delta\tau_0\Delta\omega) & P(\Delta\tau_0\Delta a_0) & \cdots & P(\Delta\tau_0\Delta a_i) & \cdots & P(\Delta\tau_0\Delta a_{63}) & P(\Delta\tau_0\Delta\tau_0) & \cdots P(\Delta\tau_0\Delta\tau_i) & \cdots P(\Delta\tau_0\Delta\tau_{63}) \\ P(\Delta\tau_i\Delta\omega) & P(\Delta\tau_i\Delta a_0) & \cdots & P(\Delta\tau_i\Delta a_i) & \cdots & P(\Delta\tau_i\Delta a_{63}) & P(\Delta\tau_i\Delta\tau_0) & \cdots P(\Delta\tau_i\Delta\tau_i) & \cdots P(\Delta\tau_i\Delta\tau_{63}) \\ P(\Delta\tau_{63}\Delta\omega) & P(\Delta\tau_{63}\Delta a_0) & \cdots & P(\Delta\tau_{63}\Delta a_i) & \cdots & P(\Delta\tau_{63}\Delta a_{63}) & P(\Delta\tau_{63}\Delta\tau_0) & \cdots P(\Delta\tau_{63}\Delta\tau_i) & \cdots P(\Delta\tau_{63}\Delta\tau_{63}) \\ P(\Delta\theta_0\Delta\omega) & P(\Delta\theta_0\Delta a_0) & \cdots & P(\Delta\theta_0\Delta a_i) & \cdots & P(\Delta\theta_0\Delta a_{63}) & P(\Delta\theta_0\Delta\tau_0) & \cdots P(\Delta\theta_0\Delta\tau_i) & \cdots P(\Delta\theta_0\Delta\tau_{63}) \\ P(\Delta\theta_i\Delta\omega) & P(\Delta\theta_i\Delta a_0) & \cdots & P(\Delta\theta_i\Delta a_i) & \cdots & P(\Delta\theta_i\Delta a_{63}) & P(\Delta\theta_i\Delta\tau_0) & \cdots P(\Delta\theta_i\Delta\tau_i) & \cdots P(\Delta\theta_i\Delta\tau_{63}) \\ P(\Delta\theta_{63}\Delta\omega) & P(\Delta\theta_{63}\Delta a_0) & \cdots & P(\Delta\theta_{63}\Delta a_i) & \cdots & P(\Delta\theta_{63}\Delta a_{63}) & P(\Delta\theta_{63}\Delta\tau_0) & \cdots P(\Delta\theta_{63}\Delta\tau_i) & \cdots P(\Delta\theta_{63}\Delta\tau_{63}) \end{array}\right.$$

$$\begin{bmatrix} P(\Delta\omega\Delta\theta_0) & \cdots & P(\Delta\omega\Delta\theta_j) & \cdots & P(\Delta\omega\Delta\theta_{63}) \\ P(\Delta a_0\Delta\theta_0) & \cdots & P(\Delta a_0\Delta\theta_j) & \cdots & P(\Delta a_0\Delta\theta_{63}) \\ P(\Delta a_j\Delta\theta_0) & \cdots & P(\Delta a_j\Delta\theta_j) & \cdots & P(\Delta a_j\Delta\theta_{63}) \\ P(\Delta a_{63}\Delta\theta_0) & \cdots & P(\Delta a_{63}\Delta\theta_j) & \cdots & P(\Delta a_{63}\Delta\theta_{63}) \\ P(\Delta\tau_0\Delta\theta_0) & \cdots & P(\Delta\tau_0\Delta\theta_j) & \cdots & P(\Delta\tau_0\Delta\theta_{63}) \\ P(\Delta\tau_j\Delta\theta_0) & \cdots & P(\Delta\tau_j\Delta\theta_j) & \cdots & P(\Delta\tau_j\Delta\theta_{63}) \\ P(\Delta\tau_{63}\Delta\theta_0) & \cdots & P(\Delta\tau_{63}\Delta\theta_j) & \cdots & P(\Delta\tau_{63}\Delta\theta_{63}) \\ P(\Delta\theta_0\Delta\theta_0) & \cdots & P(\Delta\theta_0\Delta\theta_j) & \cdots & P(\Delta\theta_0\Delta\theta_{63}) \\ P(\Delta\theta_j\Delta\theta_0) & \cdots & P(\Delta\theta_j\Delta\theta_j) & \cdots & P(\Delta\theta_j\Delta\theta_{63}) \\ P(\Delta\theta_{63}\Delta\theta_0) & \cdots & P(\Delta\theta_{63}\Delta\theta_j) & \cdots & P(\Delta\theta_{63}\Delta\theta_{63}) \end{bmatrix} \begin{bmatrix} \Delta\omega \\ \Delta a_i \\ \Delta\tau_i \\ \Delta\theta_i \end{bmatrix} = \begin{bmatrix} P\Delta\omega\text{CONST.} \\ P\Delta a_0\text{CONST.} \\ P\Delta a_j\text{CONST.} \\ P\Delta a_{63}\text{CONST.} \\ P\Delta\tau_0\text{CONST.} \\ P\Delta\tau_j\text{CONST.} \\ P\Delta\tau_{63}\text{CONST.} \\ P\Delta\theta_0\text{CONST.} \\ P\Delta\theta_j\text{CONST.} \\ P\Delta\theta_{63}\text{CONST.} \end{bmatrix}$$

METHOD AND APPARATUS FOR MEASURING WAVEFORM QUALITY OF CDMA SIGNAL

BACKGROUND OF THE INVENTION

1. Field of the Invention

The present invention relates to a method and apparatus for measuring the waveform quality of a CDMA (Code Division Multiple Access) modulated signal that is used in mobile communications or the like.

2. Description of the Related Art

A conventional method for measuring evaluation parameters of each channel signal in a radio wave radiated from a base station of CDMA mobile communications, that is, a power coefficient $\rho_i$, the output timing $\Delta\tau_i$ and a phase offset $\Delta\theta_i$, is described, for example, in a thesis entitled "Overview of Code-Domain Power, Timing, and Phase Measurements", Hewlett-Packard Journal, pp.73–93, February 1996.

Figure 3:
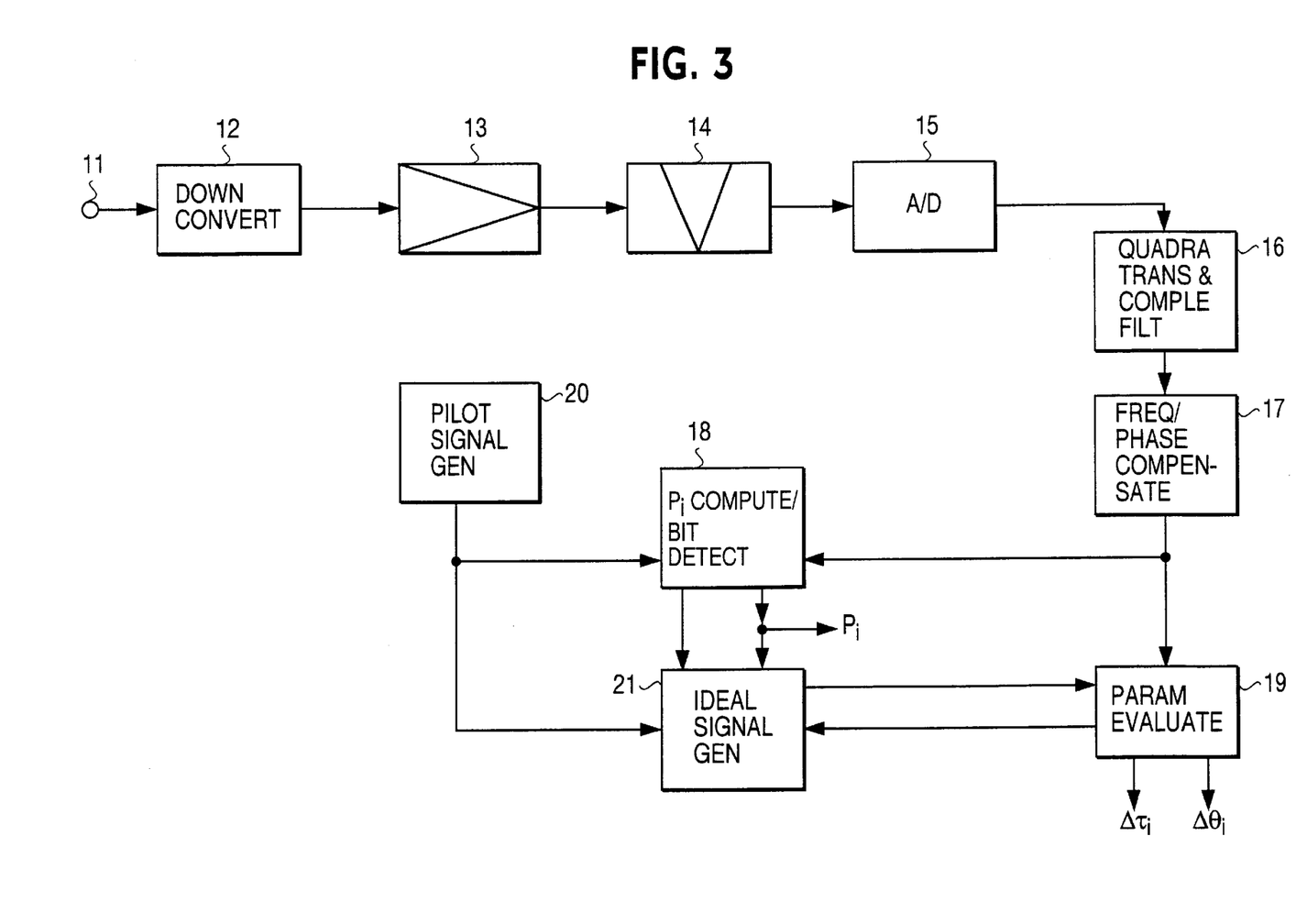
FIG. 3 is a block diagram showing the general configuration of a conventional CDMA signal waveform quality measuring apparatus.

Referring to FIG. 3, the conventional method will be described in brief. A CDMA signal from a base station is inputted via an input terminal 11 into a down converter 12. The CDMA signal is converted by the down converter 12 to an IF signal which is, in turn, amplified by an amplifier 13. The amplified IF signal is band-limited by a filter 14 and converted by an A/D (analog-to-digital) converter 15 to a digital signal. The measuring signal (the CDMA signal), converted to digital form, is transformed by a quadrature transform part 16 to a complex base band signal. The base band signal is applied to a frequency/phase compensating part 17 wherein its frequency and phase shifts are compensated for. The compensated base band signal is applied to a $\rho_i$ computation/bit detection part 18 and a parameter evaluating part 19.

A pilot signal generating part 20 is a means for generating a known pilot signal. Based on the known pilot signal from the pilot signal generating part 20 and the output from the frequency/phase compensating part 17, the $\rho_i$ computation/bit detection part 18 computes the power coefficient $\rho_i$ and detects a bit for each channel. The power coefficient $\rho_i$ and the bit thus detected are provided to an ideal signal generating part 21 which generates an ideal signal from the detected bit and power coefficient $\rho_i$ and the pilot signal fed from the pilot signal generating part 20. The ideal signal is applied to the parameter evaluating part 19.

The parameter evaluating part 19 is also supplied with the output from the frequency/phase compensating part 17. Based on the both input signals, the parameter evaluating part 19 computes an output timing (a time lag) $\Delta\tau_i$ and a phase offset (a phase shift) $\Delta\theta_i$ of each of other channels relative to a pilot channel in the input signal (the CDMA signal) so as to minimize the mean square of the difference between the two input signals. The thus computed outputs $\Delta\tau_i$ and $\Delta\theta_i$ are fed back to the ideal signal generating part 21. The ideal signal generating part 21 re-creates and applies an ideal signal to the parameter evaluating part 19 which repeatedly computes the output timing $\Delta\tau_i$ and the phase offset $\Delta\theta_i$.

The above conventional method computes the output timing $\Delta\tau_i$ and the phase offset $\Delta\theta_i$ in the parameter evaluating part 19 through their optimization but does not involve optimization of the power coefficient $\rho_i$. On this account, the computed power coefficient $\rho_i$ remains affected by the output timing $\Delta\tau_i$ and the phase offset $\Delta\theta_1$, and hence its accuracy of measurement is low. Since the ideal signal generating part 21 uses the low-accuracy power coefficient $\rho_i$ to generate the ideal signal, the measured output timing and phase offset $\Delta\tau_i$ and $\Delta\theta_i$ also lack accuracy.

SUMMARY OF THE INVENTION

It is therefore an object of the present invention to provide a measuring method with which it is possible to measure the waveform quality of the CDMA modulated signal with high accuracy.

Another object of the present invention is to provide a measuring apparatus with which it is possible to measure the waveform quality of the CDMA modulated signal with high accuracy.

According to an aspect of the present invention, there is provided a method for measuring the waveform quality of a CDMA signal, which comprises: a correcting steps of correcting a carrier frequency shift of a digital measuring signal transformed to a base band signal; a demodulating step of demodulating the corrected digital measuring signal to obtain demodulated data (bit data) and an amplitude value; an ideal signal generating step of generating an ideal signal based on the demodulated data, the amplitude value and estimated parameters; a parameter estimating step of estimating various parameters from the ideal signal and the corrected measuring signal; an optimization step of repeating the correction of the carrier frequency shift of the digital measuring signal in the correcting step and the generation of the ideal signal in the ideal signal generating step through utilization of the estimated parameters and repeating the demodulating step and the parameter estimating step until the estimated parameters are optimized; and a power coefficient computation step of computing the power coefficient of the measuring signal with the estimated parameters optimized.

The correcting step corrects the measuring signal also using amplitude, time lag or delay and phase parameters of a specified channel thereof. The parameter estimating step estimates the amplitude, time lag or delay and phase parameters by solving approximate simultaneous equations of a parameter that minimizes the square of the difference between the measuring signal and the ideal signal.

The parameter estimating step comprises a step of computing five pieces of auxiliary data A(k), B(k), C(k), I(k) and H(k) using the ideal signal, the amplitude parameter, the time lag or delay parameter, the phase parameter and a data number (time) k as variables, and a step of solving the approximate simultaneous equations through the use of the five pieces of auxiliary data and the measuring signal.

According to another aspect of the present invention, there is provided an apparatus for measuring the waveform quality of a CDMA signal, which comprises: analog-to-digital converting means for converting an input CDMA signal to a digital signal; quadrature transform and correcting means for transforming the digital signal to a digital measuring signal of the baseband and for correcting its carrier frequency shift; demodulating means for demodulating the corrected digital measuring signal to obtain its demodulated data and amplitude value; pilot signal generating means for generating a known pilot signal; means for generating an ideal signal from the demodulated data and the pilot signal and for generating auxiliary data from the ideal signal through calculation; parameter estimating means for estimating various parameters from the auxiliary data and the corrected digital measuring signal through calculation; means for updating estimated parameters used so far with the parameters currently estimated by the parameter estimating means; and power coefficient computation means for computing the power coefficient of the measuring signal with the estimated parameters optimized.

In the preferred embodiment of the invention, there is provided storage means for storing the digital signal converted by the analog-to-digital converting means. The stored digital signal is read out from the storage means by the analog-to-digital converting means.

According to the present invention, in quadrature transform step the input signal is corrected using various parameters to create a measuring base band signal. In the demodulating step demodulated data and an initially estimated amplitude value are detected from the measuring base band signal. In the ideal signal generating step an ideal signal is generated from the demodulated data, the amplitude value and other estimated parameters. In the parameter estimating step various parameters are estimated from the ideal signal and the measuring base band signal. In the optimizing step the estimated various parameters are used to optimize the generation of the measuring base band signal and the ideal signal, after which the demodulating step, the ideal signal generating step and the parameter estimating step are repeated. After the optimization the power coefficient of the measuring signal is computed in the power coefficient computation step.

In the present invention all parameters are estimated in the parameter estimating step. This scheme will be described below. An ideal signal R is optimized so that the square of a difference $\epsilon$ between it and a measuring signal Z is minimized as given by the following equation (1):

$$\varepsilon^2 = \sum_{k=1}^{64N} |Z_k - \hat{R}_k|^2 \tag{1}$$

where k is the number of sampled data, $Z_k$ is data $Z_k=Z(t_k)$ obtained by sampling the measuring signal Z at chip intervals and $R_k$ shows an optimal ideal signal when the difference $\epsilon$ has been minimized.

The optimal ideal signal $R_k$ is given by the following equation (2):

$$\hat{R}_k = \sum_i R_i(t_k + \hat{\tau}_i)\exp(j[\Delta\hat{\omega}(t_k + \hat{\tau}_i) + \hat{\theta}_i]) \tag{2}$$

where $\hat{\tau}_i$ is the optimum value of i-th channel signal output timing, $\Delta\hat{\omega}$ is the optimum value of a carrier frequency error, $\hat{\theta}_i$ is the optimum value of the carrier phase of the i-th channel signal, and $$\sum_i$$

represents the summation of ideal signals of all channels.

The ideal signal $R_i$ can be expressed by the following equation (3):

$$R_i(t) = a_i\left[\sum_k g(t - kT_c)\cos\phi_{i,k} + j\sum_k g(t - kT_c)\sin\phi_{i,k}\right] \tag{3}$$

Substituting $\hat{a}_i$ for $a_i$ in Eq. (3) on the assumption that the ideal signal has been optimized in the optimizing step, we have $$R_i(t) = \hat{a}_i\left[\sum_k g(t - kT_c)\cos\phi_{i,k} + j\sum_k g(t - kT_c)\sin\phi_{i,k}\right] \tag{4}$$

where the term inside the bracket [ ] represents an ideal signal whose amplitude is 1, and $\hat{a}_i$ is the optimum value of the amplitude of the i-th channel signal, and $\hat{R}_k$ can be expressed by the following equation (5):

$$\hat{R}_k = \sum_i \hat{a}_i \cdot R_i(t_k + \hat{\tau}_i)\exp(j[\Delta\hat{\omega}(t_k + \hat{\tau}_i) + \hat{\theta}_i]) \tag{5}$$

where $R'_i$ is the term inside the bracket [ ] in Eq. (4).

From these optimum values of the parameters the following values can be obtained.

$\Delta\hat{\omega}$:estimated value of the carrier frequency error $\Delta\hat{\tau}_i=\hat{\tau}_i-\hat{\tau}_0$:estimated value of the timing difference (time lag) of the i-th channel relative to the 0-th channel $\Delta\hat{\theta}_i=\hat{\theta}_i-\hat{\theta}_0$:estimated value of the phase difference of the i-th channel relative to the 0-th channel That is, the estimated amount of delay $\hat{\tau}_0$ and the estimated phase $\hat{\theta}_0$ of the 0-th channel are taken from values at appropriate points in time of the measured timing, and the phase at the measured time, and the estimated values $\Delta\hat{\tau}_i$ and $\Delta\hat{\theta}_i$ can be computed from these values $\hat{\tau}_0$ and $\hat{\theta}_0$ and the estimated amount of delay $\hat{\tau}_i$ and the estimated phase $\hat{\theta}_0$ of the i-th channel relative to the measured timing.

In the optimizing step the sampling of the measuring signal Z is repeated so that $\hat{\tau}_0$ is reduced down to zero. Consequently, optimized parameters will ultimately be determined from sampling data at the time when $\hat{\tau}_0$ becomes zero. The measuring signal Z at the point of completion of the optimizing step is used to compute the power coefficient $\rho i$ in each channel by the following equation (6):

$$\rho_i = \frac{\sum_{j=1}^{N}\left|\sum_{k=1}^{64} Z_{j,k} R^*_{i,j,k}\right|^2}{\left\{\sum_{k=1}^{64}|R_{i,j,k}|^2\right\}\left\{\sum_{j=1}^{N}\sum_{k=1}^{64}|Z_{j,k}|^2\right\}} \tag{6}$$

where j and k are symbols used in place of sampling numbers. If k until now is replaced with k', the Eq. (6) can be expressed by the following equation:

$k'=k-1+(j-1)\times64$

In Eq. (6) $R_{i,j,k}$ is the same as R' used so far.

To minimize the difference $\epsilon^2$ between the measuring signal Z and the ideal signal R given by Eq. (1), an equation by the partial differentiation of Eq. (1) with each parameter needs only to be solved zero. The partial differential equation is a polynomial using a combination of parameters. The parameters are each determined by formulating simultaneous linear equations approximate to respective partial differential equations with terms of the second and subsequent orders of each parameter omitted and by solving the simultaneous linear equations, In order that the parameters $\Delta\hat{\omega}$, $\hat{\tau}_i$, $\hat{\theta}_i$ and $\hat{a}_i$ currently defined may be handled as parameters of the optimization equation, the following correction parameters $\omega'$, $\tau'_i$, $\theta'_i$ and $a'_i$ are introduced.

$\Delta\hat{\omega}=\omega'+\Delta\omega$ $\hat{\tau}_i=\tau'_i+\Delta\tau_i$ $\hat{\theta}_i=\theta'_i+\Delta\theta_i$ $\hat{a}_i = a'_i + \Delta a_i$ These parameters are optimized so that the parameters added with $\Delta$ will ultimately be zero. These parameters $\omega'$, $\tau'_i$, $\theta'_i$ and $a'_i$ contain errors prior to their optimization. The parameter $\omega'$ is used as an estimated value before it is optimized. This parameter is used to correct the measuring signal in advance. The other parameters are used as estimated values prior to their optimization. These parameters are used to correct the ideal signal in advance.

The introduction of the above-mentioned parameters permits approximation of a function around the zero point, allowing ease in deriving the optimization equation. Even if an approximate expression is used as the optimization equation, the parameter $\omega'$ and others are corrected step by step by creating an optimization loop. Hence, the approximation accuracy increases with an increase in the number of times the optimization loop is executed.

Formulation of $\tau'_i$ $\tau$ is formulated in the equation of the ideal signal R. Let it be assumed, as regards the ideal signal R, that only data is obtained at sampling intervals. Since the sampling time interval is expressed by $t_k$, R is given as follows:

$$R(t_k)$$

A digital filtering scheme is known as a method for obtaining a value displaced $\tau$ from the sampled value R.

$$R(t_k - \tau)$$

Letting an impulse response of a suitable digital filter be represented by h(t), a $\tau$-shifted impulse response $h(mT_s - \tau)$ is pre-computed. With the use of this impulse response, a value R shifted by $\tau$ can be obtained by the following equation:

$$R(t_k - \tau) = \sum_{m=-M}^{M} h(mT_s - \tau) \cdot R(t_k - mT_s) \quad (7)$$

where $T_s$ is the sampling intervals. This impulse response is approximated by using a Taylor expansion around zero and leaving the equation down to the second order term. Thus the impulse response is given by the following equation:

$$h(mT_s - \tau) \approx a(mT_s) \cdot \tau^2 + b(mT_s) \cdot \tau + c(mT_s) \quad (8)$$

R can be rewritten as follows, using the above equation (8):

$$R(t_k - \tau) = \sum_{m=-M}^{M} \{a(mT_s) \cdot \tau^2 + b(mT_s) \cdot \tau + c(mT_s)\} \cdot R(t_k - mT_s)$$

$$= \left[\sum_{m=-M}^{M} a(mT_s) \cdot R(t_k - mT_s)\right] \cdot \tau^2 +$$

$$\left[\sum_{m=-M}^{M} b(mT_s) \cdot R(t_k - mT_s)\right] \cdot \tau^2 +$$

$$\left[\sum_{m=-M}^{M} c(mT_s) \cdot R(t_k - mT_s)\right]$$

Since $t_k = kT_s$, the following equation (9) is obtained by omitting $T_s$.

$$R(t_k - \tau) = \left[\sum_{m=-M}^{M} a(m) \cdot R(k - m)\right] \cdot \tau^2 + \left[\sum_{m=-M}^{M} b(m) \cdot R(k - m)\right] \cdot \tau + \left[\sum_{m=-M}^{M} c(m) \cdot R(k - m)\right] \quad (9)$$

By substituting this equation into a defining equation it is possible to formulate simultaneous equations using the respective parameters.

It is very complex to formulate the optimization equation through utilization of all mathematical expression involved and the computational complexity can be reduced by pre-computing them together. To this end, the five symbols described below are introduced.

$$A_i(k) = a'_i \cdot \left[\sum_{m=-M}^{M} a(m) \cdot R_i(k - m)\right] \cdot e^{j\theta'_i} \quad (10)$$

$$B_i(k) = \begin{cases} 2a'_i \cdot \left[\sum_{m=-M}^{M} a(m) \cdot R_i(k - m)\right] \cdot \tau'_i + \\ a'_i \cdot \left[\sum_{m=-M}^{M} b(m) \cdot R_i(k - m)\right] \end{cases} \cdot e^{j\theta'_i} \quad (11)$$

$$C_i(k) = \begin{cases} a'_i \cdot \left[\sum_{m=-M}^{M} a(m) \cdot R_i(k - m)\right] \cdot \tau'^2_i + \\ a'_i \cdot \left[\sum_{m=-M}^{M} b(m) \cdot R_i(k - m)\right] \cdot \tau'_i + \\ a'_i \cdot \left[\sum_{m=-M}^{M} c(m) \cdot R_i(k - m)\right] \end{cases} \cdot e^{j\theta'_i} \quad (12)$$

$$I_i(k) = \begin{cases} \left[\sum_{m=-M}^{M} a(m) \cdot R_i(k - m)\right] \cdot \tau'^2_i + \\ \left[\sum_{m=-M}^{M} b(m) \cdot R_i(k - m)\right] \cdot \tau'_i + \\ \left[\sum_{m=-M}^{M} c(m) \cdot R_i(k - m)\right] \end{cases} \cdot e^{j\theta'_i} \quad (13)$$

$$H_i(k) = \begin{cases} 2 \cdot \left[\sum_{m=-M}^{M} a(m) \cdot R_i(k - m)\right] \cdot \tau'_i + \\ \left[\sum_{m=-M}^{M} b(m) \cdot R_i(k - m)\right] \end{cases} \cdot e^{j\theta'_i} \quad (14)$$

The partial differential equations for the respective parameters are solved from the defining equation (1).

By executing the partial differentiation, for example, with $\partial \epsilon^2/\partial \Delta \omega = 0$ to approximate each parameter to its first-order term, respective parameter and constant terms are obtained as follows:

$0 = p_{(\Delta\omega\Delta\omega)} \cdot \Delta\omega$
$\quad + p_{(\Delta\omega\Delta a_0)} \cdot \Delta a_0 + \ldots p_{(\Delta\omega\Delta a_n)} \cdot \Delta a_n \cdots + p_{(\Delta\omega\Delta a_{63})} \cdot \Delta a_{63}$
$\quad + p_{(\Delta\omega\Delta\tau_0)} \cdot \Delta\tau_0 + \ldots p_{(\Delta\omega\Delta\tau_n)} \cdot \Delta\tau_n \cdots + p_{(\Delta\omega\Delta\tau_{63})} \cdot \Delta\tau_{63}$
$\quad + p_{(\Delta\omega\Delta\theta_0)} \cdot \Delta\theta_0 + \ldots p_{(\Delta\omega\Delta\theta_n)} \cdot \Delta\theta_n \cdots + p_{(\Delta\omega\Delta\theta_{63})} \cdot \Delta\theta_{63}$
$\quad + \text{Const.}$ $$0 = p_{(\Delta\omega\Delta\omega)} \cdot \Delta\omega + \sum_i p_{(\Delta\omega\Delta a_i)} \cdot \Delta a_i +$$

-continued
$$\sum_i p_{(\Delta\omega\Delta\tau_i)} \cdot \Delta\tau_i + \sum_i p_{(\Delta\omega\Delta\theta_i)} \cdot \Delta\theta_i + Const.$$

where p's are coefficients of respective terms. These p's form a coefficient matrix.

The results of respective partial differentiations are shown below. The parameters $\Delta\omega$, $\Delta a_i$, $\Delta\tau_i$, $\Delta\theta_i$ and Const. are shown at the left-hand side of a multiplication symbol "·" (dot) and coefficients $p(\Delta\omega\Delta\omega)$, $p(\Delta\omega\Delta a_i)$, $p(\Delta\omega\Delta\tau_i)$, $p(\Delta\omega\Delta\theta_i)$ and Const. at the right-hand side of the multiplication symbol "·".

$$\frac{\partial \varepsilon^2}{\partial \Delta\omega}$$

$$\Delta\omega \to \Delta\omega \cdot \sum_i \sum_k k^2 [Z(k)_{re} C_i(k)_{re} + Z(k)_{im} C_i(k)_{im}]$$

$$\Delta a_i \to \sum_i \Delta a_i \cdot \sum_k k[Z(k)_{re} I_i(k)_{im} - Z(k)_{im} I_i(k)_{re}]$$

$$\Delta\tau_i \to \sum_i \Delta\tau_i \cdot \left\{ \begin{array}{l} \sum_j \sum_k [C_i(k)_{re} C_j(k)_{im} - C_i(k)_{im} C_i(k)_{re}] + \\ \sum_k k[Z(k)_{re} B_i(k)_{im} - Z(k)_{im} B_i(k)_{re}] + \\ \sum_k [Z(k)_{re} C_i(k)_{im} - Z(k)_{im} C_i(k)_{re}] \end{array} \right\}$$

$$\Delta\theta_i \to \sum_i \Delta\theta_i \cdot \sum_k k[Z(k)_{re} C_i(k)_{re} + Z(k)_{im} C_i(k)_{im}]$$

$$Const. \to \sum_i \sum_k k[Z(k)_{re} C_i(k)_{im} + Z(k)_{im} C_i(k)_{re}]$$

$$\frac{\partial \varepsilon^2}{\partial \Delta a_n}$$

$$\Delta\omega \to \Delta\omega \cdot \sum_k k[Z(k)_{re} I_n(k)_{im} - Z(k)_{im} I_n(k)_{re}]$$

$$\Delta a_n \to \Delta a_n \cdot \sum_k [I_n(k)_{re} I_n(k)_{re} + I_n(k)_{im} I_n(k)_{im}]$$

$$\Delta a_i \to \sum_{i \neq n} \Delta a_i \cdot \sum_k [I_i(k)_{re} I_n(k)_{re} + I_i(k)_{im} I_n(k)_{im}]$$

$$\Delta\tau_n \to \Delta\tau_n \cdot \left\{ \begin{array}{l} \sum_k [B_n(k)_{re} I_n(k)_{re} + B_n(k)_{im} I_n(k)_{im}] + \\ \sum_i \sum_k [C_i(k)_{re} H_n(k)_{re} + C_i(k)_{im} H_n(k)_{im}] - \\ \sum_k [Z(k)_{re} H_n(k)_{re} - Z(k)_{im} H_n(k)_{im}] \end{array} \right\}$$

$$\Delta\tau_i \to \sum_{i \neq n} \Delta\tau_i \cdot \sum_k [B_i(k)_{re} I_n(k)_{re} + B_i(k)_{im} I_n(k)_{im}]$$

$$\Delta\theta_n \to \Delta\theta_n \cdot \left\{ \begin{array}{l} \sum_{i \neq n} \sum_k [C_i(k)_{im} I_n(k)_{re} - C_i(k)_{re} I_n(k)_{im}] + \\ \sum_k [Z(k)_{re} I_n(k)_{im} - Z(k)_{im} I_n(k)_{re}] \end{array} \right\}$$

$$\Delta\theta_i \to \sum_{i \neq n} \Delta\theta_i \cdot \sum_k [C_i(k)_{re} I_n(k)_{im} - C_i(k)_{im} I_n(k)_{re}]$$

$$Const. \to \left\{ \begin{array}{l} \sum_i \sum_k [C_i(k)_{re} I_n(k)_{re} + C_i(k)_{im} I_n(k)_{im}] - \\ \sum_k [Z(k)_{re} I_n(k)_{re} + Z(k)_{im} I_n(k)_{im}] \end{array} \right\}$$

$$\frac{\partial \varepsilon^2}{\partial \Delta\tau_n}$$

$$\Delta\omega \to \Delta\omega \cdot \left\{ \begin{array}{l} \sum_{i \neq n} \sum_k [C_n(k)_{re} C_i(k)_{im} - C_n(k)_{im} C_i(k)_{re}] + \\ \sum_k k[Z(k)_{re} B_n(k)_{im} - Z(k)_{im} B_n(k)_{re}] + \\ \sum_k [Z(k)_{re} C_n(k)_{im} - Z(k)_{im} C_n(k)_{re}] \end{array} \right\}$$

$$\Delta a_n \to \Delta a_n \cdot \left\{ \begin{array}{l} \sum_k [B_n(k)_{re} I_n(k)_{re} + B_n(k)_{im} I_n(k)_{im}] + \\ \sum_i \sum_k [C_i(k)_{re} H_n(k)_{re} - C_i(k)_{im} H_n(k)_{im}] - \\ \sum_k [Z(k)_{re} H_n(k)_{re} - Z(k)_{im} H_n(k)_{im}] \end{array} \right\}$$

$$\Delta a_i \to \sum_{i \neq n} \Delta a_i \cdot \sum_k [B_n(k)_{re} I_i(k)_{re} + B_n(k)_{im} I_i(k)_{im}]$$

$$\Delta\tau_n \to \Delta\tau_n \cdot \left\{ \begin{array}{l} 2\sum_i \sum_k [C_i(k)_{re} A_n(k)_{re} + C_i(k)_{im} A_n(k)_{im}] + \\ \sum_k [B_n(k)_{re} B_n(k)_{re} + B_n(k)_{im} B_n(k)_{im}] - \\ 2\sum_k [Z(k)_{re} A_n(k)_{re} + Z(k)_{im} A_n(k)_{im}] \end{array} \right\}$$

$$\Delta\tau_i \to \sum_{i \neq n} \Delta\tau_i \cdot \sum_k [B_n(k)_{re} B_i(k)_{re} + B_n(k)_{im} B_i(k)_{im}]$$

$$\Delta\theta_n \to \Delta\theta_n \cdot \left\{ \begin{array}{l} \sum_{i \neq n} \sum_k [C_i(k)_{im} B_n(k)_{re} - C_i(k)_{re} B_n(k)_{im}] + \\ \sum_k [Z(k)_{re} B_n(k)_{im} - Z(k)_{im} B_n(k)_{re}] \end{array} \right\}$$

$$\Delta\theta_i \to \sum_{i \neq n} \Delta\theta_i \cdot \sum_k [C_i(k)_{re} B_n(k)_{im} - C_i(k)_{im} B_n(k)_{re}]$$

$$Const. \to \left\{ \begin{array}{l} \sum_i \sum_k [C_i(k)_{re} B_n(k)_{re} + C_i(k)_{im} B_n(k)_{im}] - \\ \sum_k [Z(k)_{re} B_n(k)_{re} + Z(k)_{im} B_n(k)_{im}] \end{array} \right\}$$

$$\frac{\partial \varepsilon^2}{\partial \Delta\theta_n}$$

$$\Delta\omega \to \Delta\omega \cdot \sum_k k[-Z(k)_{re} C_n(k)_{re} - Z(k)_{im} C_n(k)_{im}]$$

$$\Delta a_n \to \Delta a_n \cdot \left\{ \begin{array}{l} \sum_{i \neq n} \sum_k [C_i(k)_{re} I_n(k)_{im} - C_i(k)_{im} I_n(k)_{re}] - \\ \sum_k [Z(k)_{re} I_n(k)_{im} - Z(k)_{im} I_n(k)_{re}] \end{array} \right\}$$

$$\Delta a_i \to \sum_{i \neq n} \Delta a_i \cdot \sum_k [C_n(k)_{im} I_i(k)_{re} - C_n(k)_{re} I_i(k)_{im}]$$

-continued $$\Delta\tau_n \to \Delta\tau_n \cdot \left\{ \begin{array}{l} \sum_{i \neq n} \sum_k [C_i(k)_{re}B_n(k)_{im} - C_i(k)_{im}B_n(k)_{re}] - \\ \sum_k [Z(k)_{re}B_n(k)_{im} - Z(k)_{im}B_n(k)_{re}] \end{array} \right\}$$

$$\Delta\tau_i \to \sum_{i \neq n} \Delta\tau_i \cdot \sum_k [C_n(k)_{im}B_i(k)_{re} - C_n(k)_{re}B_i(k)_{im}]$$

$$\Delta\theta_n \to \Delta\theta_n \cdot \left\{ \begin{array}{l} \sum_{i \neq n} \sum_k [C_i(k)_{re}C_n(k)_{re} + C_i(k)_{im}C_n(k)_{re}] - \\ \sum_k [Z(k)_{re}C_n(k)_{re} + Z(k)_{im}C_n(k)_{im}] \end{array} \right\}$$

$$\Delta\theta_i \to \sum_{i \neq n} \Delta\theta_i \cdot \sum_k -[C_n(k)_{re}C_i(k)_{re} + C_n(k)_{im}C_i(k)_{im}]$$

$$Const. \to \sum_{i \neq n} \sum_k [C_i(k)_{re}C_n(k)_{im} - C_i(k)_{im}C_n(k)_{re}] -$$
$$\sum_k [Z(k)_{re}C_n(k)_{im} - Z(k)_{im}C_n(k)_{re}]$$

The respective parameter values are obtained by solving the simultaneous equations as shown in FIG. 1 which are formed by a matrix of the coefficients p's and a matrix of the parameters $\Delta\omega$, $\Delta a_i$, $\Delta\tau_i$ and $\Delta\theta_i$ given above.

The thus obtained parameters $\Delta\omega$, $\Delta a_i$, $\Delta\tau_i$ and $\Delta\theta_i$ are used to update the correcting parameters $\omega'$, $a'_i$, $\tau'_i$ and $\theta'_i$ as follows:

$$\omega' \leftarrow \omega' + \Delta\omega$$
$$a'_i \leftarrow a'_i + \Delta a_i$$
$$\tau'_i \leftarrow \tau'_i + \Delta\tau_i$$
$$\theta'_i \leftarrow \theta'_i + \Delta\theta_i \qquad (15)$$

The updated correcting parameters are used to correct the measuring signal Z and re-create the ideal signal, and the afore-mentioned optimization is repeated.

DETAILED DESCRIPTION OF THE PREFERRED EMBODIMENTS

A detailed description will be given, with reference to the accompanying drawings, of an embodiment of each of the method and apparatus for measuring the waveform quality of a CDMA signal according to the present invention.

Figure 2:
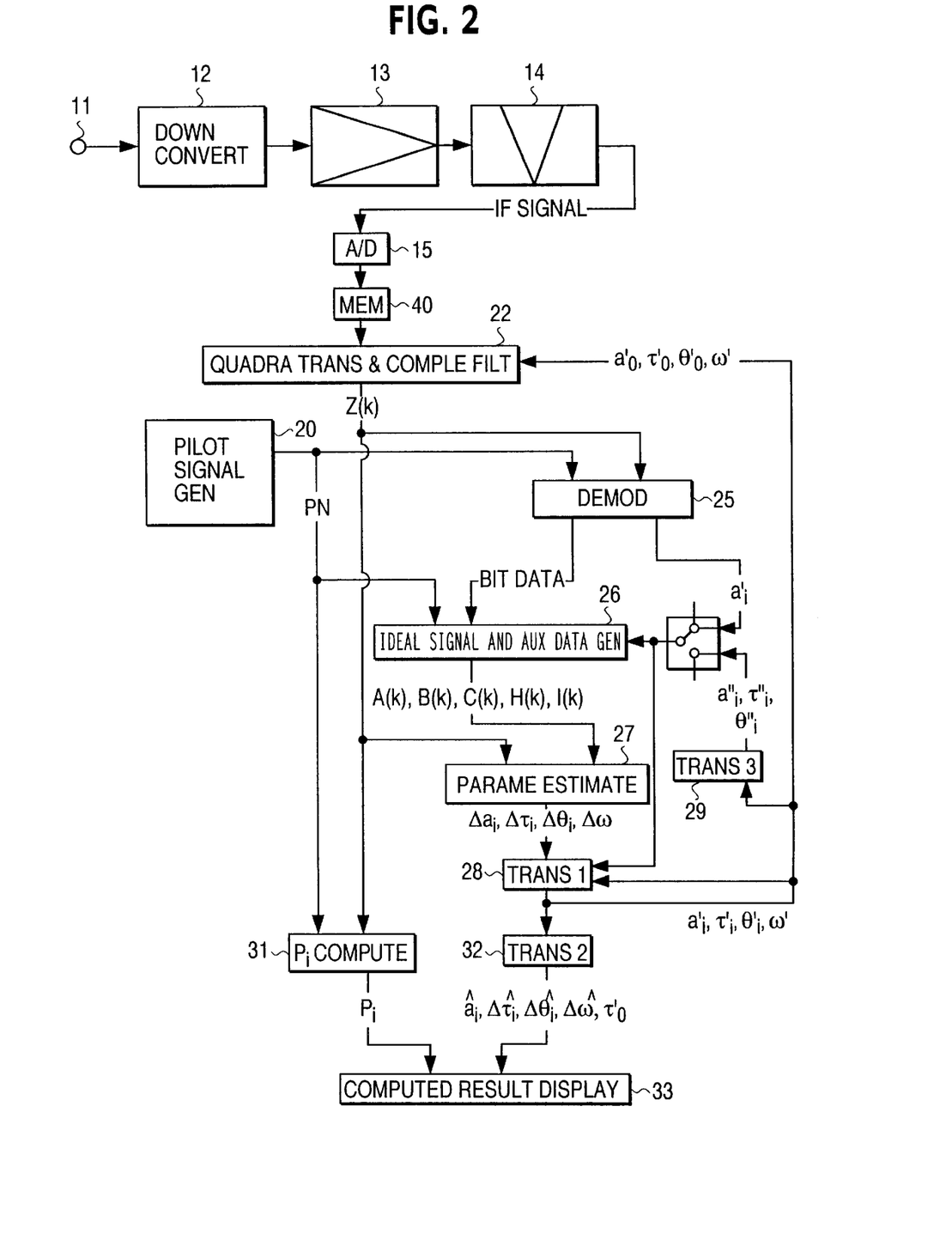
FIG. 2 is a block diagram illustrating the general configuration of an embodiment of the CDMA signal waveform quality measuring apparatus according to the present invention.

FIG. 2 illustrates in block form the configuration of an embodiment of the CDMA signal waveform quality measuring apparatus according to the present invention. The parts or components corresponding to those in FIG. 3 are identified by the same reference numerals and no description will be given unless necessary.

As is the case with the prior art example of FIG. 3, the CDMA signal from a base station is inputted via the input terminal 11 into and converted by the down converter 12 to an IF signal which is amplified by the amplifier 13. The amplified IF signal is band-limited by the filter 14 and the converted by the A/D (analog-to-digital) converter 15 to digital form. The digital IF signal is temporarily stored in a memory 40 from which it is read out and applied to a quadrature transform part/complementary filter 22. The digital IF signal is first transformed in the quadrature transform part of the quadrature transform part/complementary filter 22 to a base band signal. The base band signal is passed through the complementary filter of the quadrature transform part/complementary filter 22 that is a receiving filter or measuring filter, by which it is converted to the base band measuring signal Z(k).

The measuring signal Z(k) is applied to a demodulating part 25, wherein it is reverse-diffused or despread by the pilot signal (a PN code) from the pilot signal generating part 20. As result, bit data is demodulated and at the same time the amplitude $a'_i$ of each channel is detected. In an ideal signal/auxiliary data generating part 26 an ideal signal $R_i$ is generated from the bit data from the demodulating part 25 and the pilot signal (PN code) from the pilot signal generating part 20. Further, by computing the afore-mentioned Eqs. (10) through (14), auxiliary data are derived from the ideal signal $R_i$.

The ideal signal $R_i$ is produced as follows: The demodulated bit data from the demodulating part 25 is diffused by I- and Q-side pilot signals (PN codes) from the pilot signal generating part 20, respectively. Then chips "0" and "1" of the diffused I- and Q-side chip trains are converted to $+\sqrt{2}$ and $-\sqrt{2}$, respectively, to obtain I and Q signals of a QPSK signal whose amplitude is 1. That is, an amplitude-normalized ideal signal $R_i(k-m)$ is obtained. The ideal signal $R_i(k-m)$ and the amplitude $a'_i$ from the demodulating part 25 are used to compute the auxiliary data $A_i(k)$, $B_i(k)$, $C_i(k)$, $I_i(k)$ and $H_i(k)$ of Eqs. (10) through (14).

These auxiliary data $A_i(k)$, $B_i(k)$, $C_i(k)$, $I_i(k)$, $H_i(k)$ and the measuring signal Z(k) are inputted into a parameter estimating part 27, wherein the simultaneous equations depicted in FIG. 1 are solved to obtain respective estimated values $\Delta a_i$, $\Delta\tau_i$, $\Delta\theta_i$ and $\Delta\omega$. In a first transform part 28 these estimated values are used to update the previous correcting parameters $a'_i$, $\tau'_i$, $\theta'_i$ and $\omega'$ by Eq. (15). The updated correcting parameters $a'_i$, $\tau'_i$, $\theta'_i$ and $\omega'$ are used to correct the measuring signal Z(k). The thus corrected measuring signal Z(k) undergoes again the processes of the demodulating part 25, the ideal signal/auxiliary data generating part 26, the parameter estimating part 27 and the first transform part 28. This correcting process is repeated until the estimated values $\Delta a_i$, $\Delta\tau_i$, $\Delta\theta_i$ and $\Delta\omega$ are optimized, that is, until they are reduced down to zero or a value close thereto, or until they remain unchanged. This repetition of the correcting process is the optimization step. By this, the ideal signal $R_i$ as well as the measuring signal Z(k) are corrected.

The correction of the measuring signal Z(k) is made by correcting the previous measuring signal Z(k) through the following calculation:

$$Z(k) \leftarrow Z(t-\tau'_0)(1/a'_0)\exp[-j(\omega'(t-\tau'_0)+\theta'_0] \qquad (16)$$

The initial values used in this case are $a'_0=1$, $\tau'_0=0$, $\theta'_0=0$, and $\omega'_0=0$. Each time parameters are newly estimated in the parameter estimating part 27, Eq. (16) is computed for the new parameters $a'_0$, $\tau'_0$, $\theta'_0$, and $\omega'$. This correcting calculation is conducted on the signal that is inputted into the quadrature transform part/complementary filter 22, that is, on the output from the memory 40 (and consequently the output from the A/D converter 15). The correcting calculation may be conducted on the measuring signal Z(k) transformed to the baseband. But this baseband-transformed measuring signal is a signal having passed through the complementary filter (a filter of the passband width as the bandwidth of the input signal). If the signal has a large frequency error, there is a fear that part of the signal is removed by the filtering, that is, a fear that the measuring signal to be used for the parameter estimation and so on is removed. For this reason, the result of the frequency estimation is corrected at a stage preceding the complementary filter. In this instance, however, if the measuring signal transformed to the baseband in the orthogonal transform part is passed through a low-pass filter of a sufficiently large passband width in place of the complementary filter, that is, if the orthogonal transform part/complementary filter 22 is formed by an orthogonal transform part/wideband low-pass filter, the correction may be made on the baseband-transformed measuring signal.

The correcting parameters $a'_i$, $\tau'_i$, $\theta'_i$ and $\omega'$ are provided to a third transform part 29, wherein they undergo the following transformation:

$$a''_i = a'_i / a'_0$$
$$\tau''_i = \tau'_i - \tau'_0$$
$$\theta''_i = \theta'_i - \theta'_0$$

where:

$$i \neq 0 \quad (17)$$

Since the parameters of the 0-th channel of the measuring signal Z(k) have been corrected by Eq. (16), the parameters for correcting the ideal signal $R_0$ of the 0-th channel are normalized as follows:

$a''_0 = 1$
$\tau''_0 = 0$
$\theta''_0 = 0$

The parameters for the ideal signals $R_i$ of channels other than the 0-th one are corrected by the parameters of the 0th channel to have the values given by Eq. (17).

That is, in the first session of the optimizing step the parameters for the ideal signals $R_i$ of channels of the measuring signal Z(k) other than the 0-th channel are corrected by the correcting parameters of the 0-th channel. Hence, the auxiliary data generating part 26 uses, as correcting parameters, the parameters of the values normalized by the parameters of the 0-th channel by Eq. (17), that is, the output from the third transform part 29.

In other words, the parameters obtained by Eq. (17) are used to compute Eqs. (10) to (14) to obtain the auxiliary data $A_r(k)$, $B_r(k)$, $C_r(k)$, $I_r(k)$ and $B_r(k)$. The calculations for the auxiliary data use the bit data and amplitude $a'_i$ obtained by demodulating in the demodulating part 25 the measuring signal Z(k) corrected by Eq. (16).

As described above, upon each estimation of the parameters in the parameter estimating part 27, the measuring signal and the ideal signal are both corrected accordingly and the parameters are estimated again. When the estimated values of the parameters are optimized after some sessions of the correction and estimation, the power coefficient $\rho_i$ is computed by Eq. (6) from the measuring signal Z(k) and the pilot signal (the PN code) at that time in a power coefficient computation part 31. Incidentally, Eq. (6) is defined in Measurement Standards and the same as in the prior art.

The second transform part 32 performs the following calculations:

$$\hat{a}_i = a'_i$$
$$\Delta\hat{\tau}_i = \tau'_i - \tau'_0$$
$$\Delta\hat{\theta}_i = \theta'_i - \theta'_0$$
$$\Delta\hat{\omega} = \omega' \quad (18)$$

These parameters $\hat{a}_i$, $\Delta\hat{\tau}_i$, $\Delta\hat{\theta}_i$, $\Delta\hat{\omega}$, $\tau'_0$ and the power coefficient $\rho_i$ computed in the computation part 31 are displayed in a computed results display part 33. By the way, the estimation of any one of the parameters can be omitted for simplicity. For example, when $\Delta a'$ is not estimated, the amplitude-obtained in the demodulating part 25 is used intact; when $\Delta \tau'$ is not estimated, it is set at zero; and when $\Delta\omega$ is not estimated, it is similarly set at zero.

As described above, according to the present invention, estimated parameters are used to measuring signal Z(k) and the ideal signal i and the corrected both signals are used to re-estimate the parameters. The signal correction and the parameter estimation are repeated until the estimated parameters are optimized. Since this optimization utilizes all the parameters, they are all optimized. And since the measuring signal with all the parameters optimized is used to compute the power coefficient $\rho_i$, it can be obtained with high accuracy. Other parameters are also available with high accuracy because the measuring signal is contained in the optimization loop.

It will be apparent that many modifications and variations may be effected without departing from the scope of the novel concepts of the present invention.

What is claimed is:

1. A method for measuring the waveform quality of a CDMA signal, comprising:

a correcting steps of correcting a carrier frequency shift of a digital measuring signal transformed to a base band signal;

a demodulating step of demodulating said corrected digital measuring signal to obtain its demodulated data and amplitude value;

an ideal signal generating step of generating an ideal signal based on said demodulated data, said amplitude value and estimated parameters;

a parameter estimating step of estimating various parameters from said ideal signal and said corrected measuring signal;

an optimization step of repeating the correction of said carrier frequency shift of said digital measuring signal in said correcting step and the generation of said ideal signal in said ideal signal generating step through utilization of said estimated parameters and repeating said demodulating step and said parameter estimating step until said estimated parameters are optimized; and a power coefficient computation step of computing the power coefficient of said measuring signal with said estimated parameters optimized.

2. The method of claim 1, wherein said correcting step corrects said measuring signal also using amplitude, time lag or delay and phase parameters of a specified channel thereof and said parameter estimating step estimates amplitude, time lag or delay and phase parameters by solving approximate simultaneous equations of a parameter that minimizes the square of the difference between said measuring signal and said ideal signal.

3. The method of claim 2, wherein said parameter estimating step comprises a step of computing five pieces of auxiliary data A(k), B(k), C(k), I(k) and H(k) using said ideal signal, said amplitude parameter, said time lag or delay parameter, said phase parameter and a data number (time) k as variables, and a step of solving said approximate simultaneous equations through the use of said five pieces of auxiliary data and said measuring signal.

4. An apparatus for measuring the waveform quality of a CDMA signal, comprising:

analog-to-digital converting means for converting an input CDMA signal to a digital signal;

quadrature transform and correcting means for transforming said digital signal to a digital measuring signal of the baseband and for correcting its carrier frequency shift; demodulating means for demodulating said corrected digital measuring signal to obtain its demodulated data and amplitude value;

pilot signal generating means for generating a known pilot signal;

means for generating an ideal signal from said demodulated data and said pilot signal and for generating auxiliary data from said ideal signal through calculation;

parameter estimating means for estimating various parameters from said auxiliary data and said corrected digital measuring signal through calculation;

means for updating estimated parameters used so far with said parameters currently estimated by said parameter estimating means; and power coefficient computation means for computing the power coefficient of said measuring signal with said estimated parameters optimized.

5. The apparatus of claim 4, further comprising storage means for storing said digital signal converted by said analog-to-digital converting means.

* * * * *

UNITED STATES PATENT AND TRADEMARK OFFICE
CERTIFICATE OF CORRECTION

PATENT NO.: 6,104,983
DATED : August 15, 2000
INVENTOR(S): Juichi NAKADA

It is certified that errors appear in the above-identified patent and that said Letters Patent is hereby corrected as shown below:

Col. 8, line 21, change "–" (first occurrence) to --+--;
 line 23, change "–" to --+--.

Col. 9, line 43, change "Fig. 1 is a diagram" to --Figs. 1 and 2 are diagrams--.

Figure 1B:
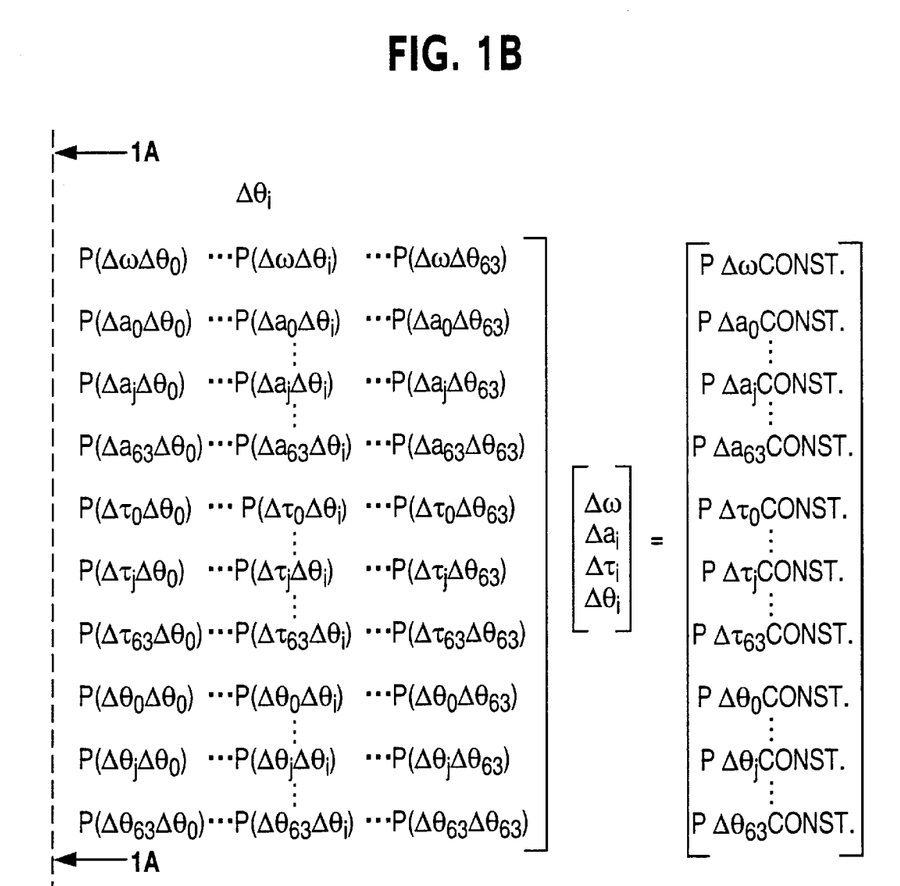
FIG. 1 is a diagram showing simultaneous equations that are used for the estimation of parameters in an embodiment of the CDMA signal waveform quality measuring method according to the present invention.

Col. 10, line 43, change "Fig. 1" to --Figs 1A and 1B--.

Col. 12, line 21, change "i" to --$R_i$--.

Col. 13, line 16, being a new paragraph with "demodulating" (first occurrence).

Signed and Sealed this

Twenty-fourth Day of April, 2001

Attest:

NICHOLAS P. GODICI

*Attesting Officer*   *Acting Director of the United States Patent and Trademark Office*